United States Patent [19]
Kaufman et al.

[11] Patent Number: 5,750,973
[45] Date of Patent: May 12, 1998

[54] CARD READER

[75] Inventors: John Wilson Kaufman, Hershey; John Edward Knaub, Etters; Adam Douglas Cunningham, Middletown, all of Pa.

[73] Assignee: The Whitaker Corporation, Wilmington, Del.

[21] Appl. No.: 739,400

[22] Filed: Oct. 31, 1996

[51] Int. Cl.⁶ .................................................. G06K 19/06
[52] U.S. Cl. .......................... 235/441; 235/441; 235/485
[58] Field of Search ................................... 235/441, 485

[56]  References Cited

U.S. PATENT DOCUMENTS

| | | | |
|---|---|---|---|
| 4,735,578 | 4/1988 | Reichardt et al. | 439/152 |
| 4,752,234 | 6/1988 | Reichardt et al. | 439/260 |
| 4,758,693 | 7/1988 | Hoffman | 200/11 R |
| 4,780,603 | 10/1988 | Hamada | 235/441 |
| 4,859,199 | 8/1989 | Komatsu | 439/267 |
| 4,935,284 | 6/1990 | Puerner | 428/137 |
| 5,000,694 | 3/1991 | Komatsu | 439/260 |
| 5,012,078 | 4/1991 | Pernet | 235/441 |
| 5,224,873 | 7/1993 | Duffet et al. | 439/326 |
| 5,231,274 | 7/1993 | Reynier et al. | 235/441 |
| 5,632,626 | 5/1997 | Collins et al. | 439/66 |

FOREIGN PATENT DOCUMENTS

0468828A1   6/1991   European Pat. Off. .
4336192A1   4/1995   Germany .

*Primary Examiner*—Harold Pitts
*Attorney, Agent, or Firm*—Katherine A. Nelson

[57]  ABSTRACT

A card reader 20 includes a dielectric housing 22, a plurality of resilient connector elements 70 disposed along the bottom wall 28 of the housing 22 and adapted to establish electrical connection between contact pads 104 of a circuit board 102 and contact pads 96 of a card 90 inserted into a card-receiving slot 40 of the reader 20, a horizontal plate 42 slidably mounted within the housing 22, and an actuator 54 for moving the plate 42. The horizontal plate 42 is proximate the top surface of the housing 22 and is movable upon actuation toward a card 90 inserted into the card receiving slot 40 beneath the plate 42 to exert pressure on and moving the card 90 toward said bottom wall 28 to effect electrical engagement between the contact pads 96 of the card 90 and the resilient connector elements 70 that, in turn, engage the contact pads 104 of the board 102.

11 Claims, 5 Drawing Sheets

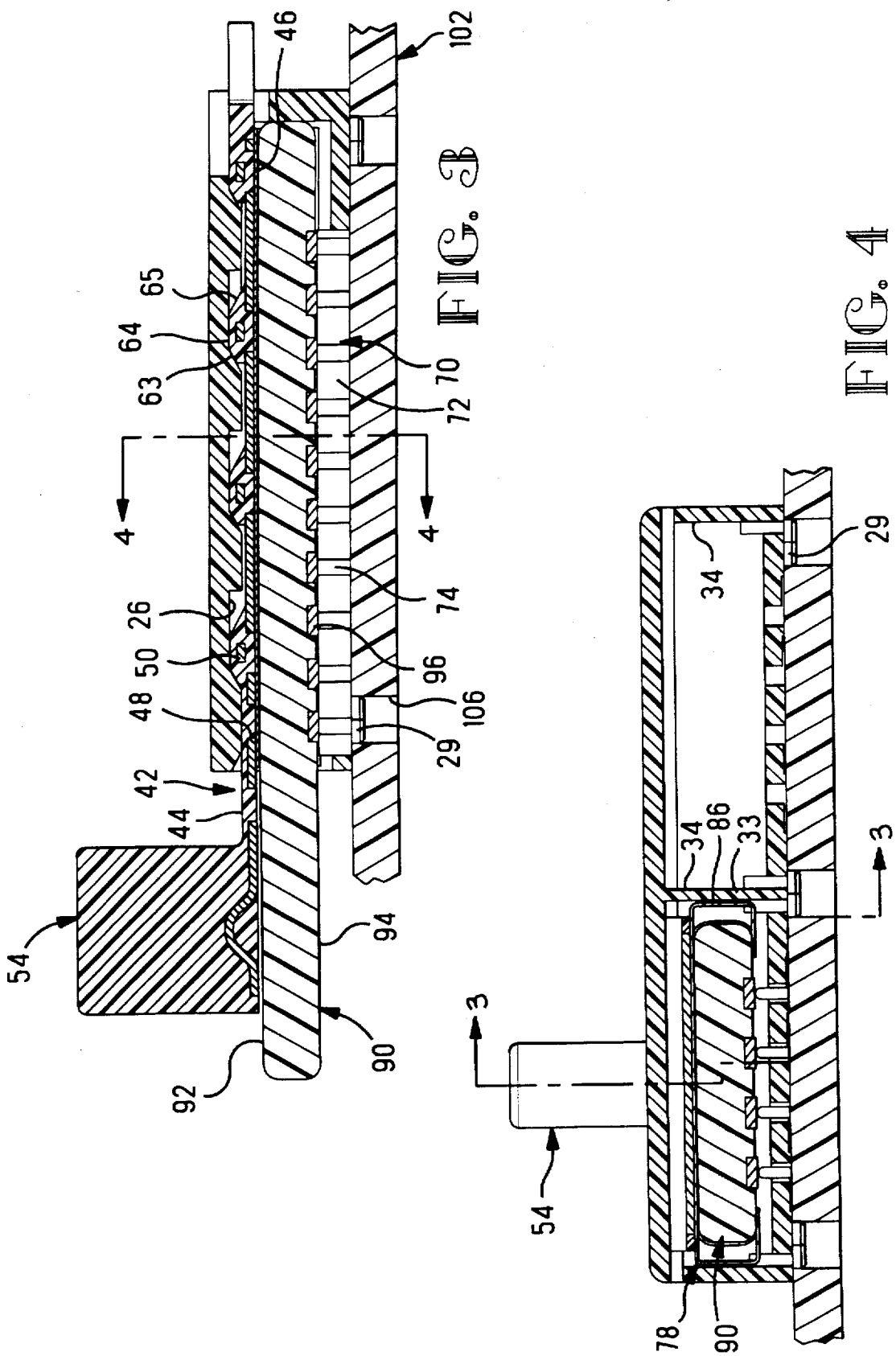

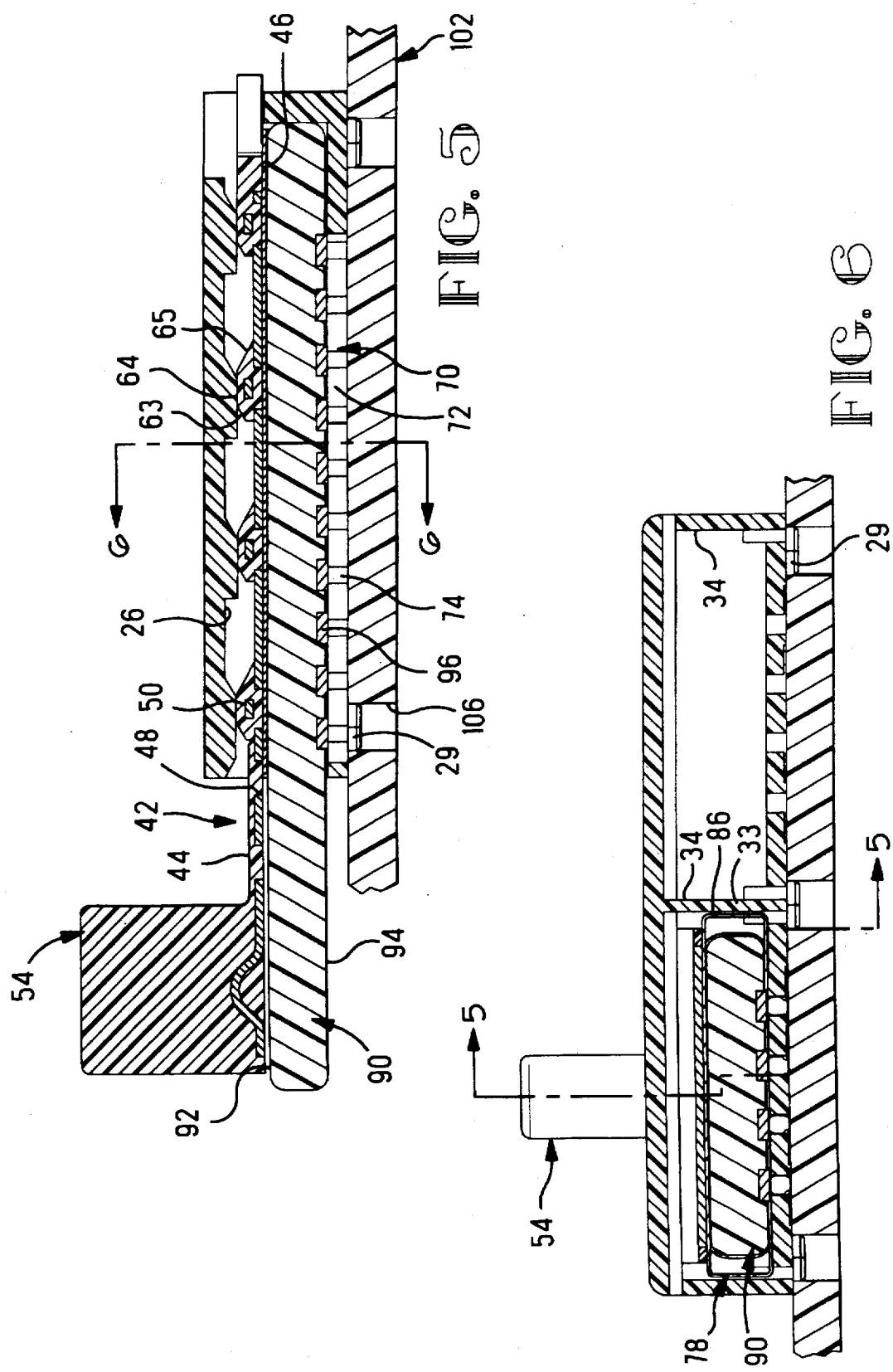

5,750,973

CARD READER

FIELD OF THE INVENTION

This invention is directed to card readers and more particularly to a card reader for cards having contacts on a surface thereof.

BACKGROUND OF THE INVENTION

Electronic memory cards of the type having a plurality of contacts on one face thereof are widely used in electronic equipment, such as computers and the like. In some memory card readers, the card is inserted into the card reader such that the front edge of the card engages the curved portions of contacts as the card is inserted into the reader. This causes elastic deformation of the contacts and results in prolonged rubbing of the curved convex areas of the contacts during the time the card is being fully inserted into and removed from the housing. Repeated insertions and removals of cards into and out of the card reader causes wear to the contact surfaces, thus decreasing the quality of the electrical connection. It is desirable, therefore, to have a card reader wherein the card may essentially be fully inserted before the contacts in the card reader engage the conductive pads on the surface of the card.

One way to accomplish this result is to use a lever or other means to move the contacts into engagement with the card after the card has been fully inserted. With the increased use of more closely spaced contact pads on the card and the accompanying miniaturization of both the card reader and the contacts therein, it is more desirable to have a card reader in which pressure can be applied to a fully inserted card to move the card into engagement with the contacts rather than move the contacts into engagement with the card. It is desirable furthermore, to have a card reader that has a low vertical height, requires a minimum amount of space on a circuit board and has a minimum number of parts.

SUMMARY OF THE INVENTION

The present invention is directed to a card reader that overcomes deficiencies in the prior art. The card reader includes a dielectric housing, a plurality of resilient connector elements disposed along the bottom wall of the housing and adapted to establish electrical connection between the contact pads of circuit board. The housing defines a camming surface with the card receiving opening at least adjacent a top wall of the housing. A horizontal plate is slideably mounted within the housing proximate the top surface and is movable between first and second positions therein upon actuation. The plate includes a cooperating camming surface adjacent and engageable with the camming surface of the housing. The plate is adapted to be moved from a first position adjacent the top wall to a second position lower than the first position upon actuation thereof thereby moving the plate toward a card inserted into the card receiving opening beneath the plate. The plate exerts pressure on the top the card and moves the card toward the bottom wall to assure that the contact pads on the card are in electrical engagement with associated ones of the resilient contact elements, which in turn, electrically engage the contacts pads on a circuit board. The card reader further includes a actuator section exposed at least for actuation from outside of the housing for moving the plate between the first and second positions.

In the preferred embodiment, the top wall of the housing includes at least one recess extending into an inside surface between the side walls and at a selected location therealong. The plate concomitantly includes at least one raised portion extending between its sides and dimensioned to be received in a respective recess of the top wall when the plate is in the first position. Preferably the top wall has a plurality of recesses spaced therealong and the plate has a corresponding plurality of raised portions, each dimensioned to be received in a respective recess.

In one embodiment the bottom wall of the reader has a plurality of slots extending therethrough parallel to the side walls and dimensioned to receive elongate resilient connector elements.

In another embodiment of the invention, individual resilient contact members are disposed in contact receiving apertures extending through the bottom wall.

The card reader may further include a shell member within the card receiving slot beneath the horizontal plate, the shell member being dimensioned to surround the top and side edges of a card inserted into the slot. The shell member is engaged by the plate when the plate is moved from the first to the second position. The shell and the card thus are simultaneously urged toward the bottom wall of the card reader such that contact pads on the card can engage the resilient connector element that, in turn, engages pads on a circuit board.

It is an object of the present invention to provide a card reader that minimizes wear on contact surfaces of a card reader.

It is a further object of the invention to provide a card reader having a low insertion force for the care.

Additionally it is an object of the invention to provide a card reader that may be included in a Type III PCMCIA card assembly to provide access to notebook computers and the like having the capability to use PCMCIA cards.

Embodiments of the invention will now be described by way of example with reference to the accompanying drawings in which like elements in different figures thereof are identified by the same reference numerals.

BRIEF DESCRIPTION OF THE DRAWINGS

FIG. 3 is a longitudinal sectional view of the card reader of FIG. 1 having a card in the slot with the plate in its first position.

FIG. 4 is a cross-sectional view of the card reader taken along line 4—4 of FIG. 2 showing a card in the slot prior to moving the plate to its second position.

FIG. 5 is a longitudinal sectional view similar to that of FIG. 3 wherein the plate has been to its second position and the contacts are engaged between the card and circuit board.

FIG. 6 is view similar to that of FIG. 4 after the plate has been moved to the second position and the card is electrically engaged to contacts on the circuit board.

DETAILED DESCRIPTION OF THE DRAWINGS

Figure 8:
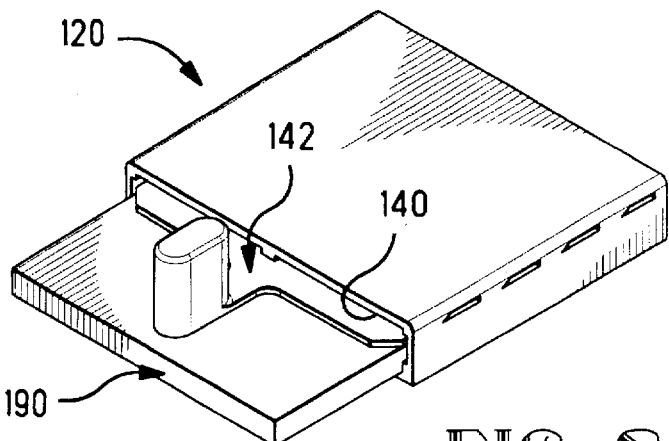
FIG. 8 is an assembled view of the alternative embodiment of the card reader having one card receiving slot and a card disposed therein.

For purposes of illustrating the invention, the card reader 20 is being shown with two card reader slots 40, each dimensioned to receive a card having a plurality of contact elements on the major surface thereof. It is to be understood that the invention is also suitable for use with card reader having only a single slot 140, such as shown in FIG. 8.

Figure 1:
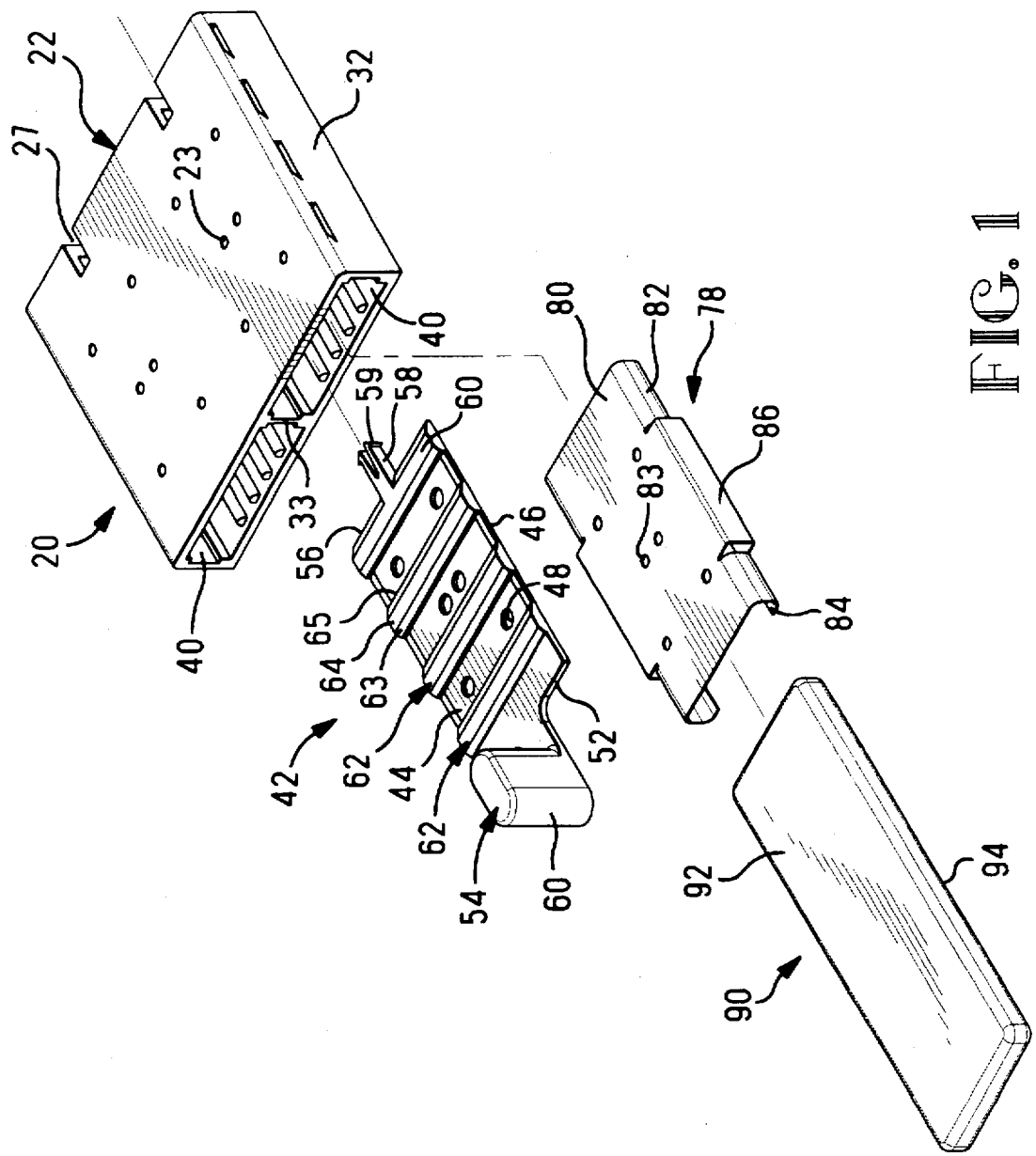
FIG. 1 is an isometric exploded view of a card reader made in accordance with the present invention.
Figure 2:
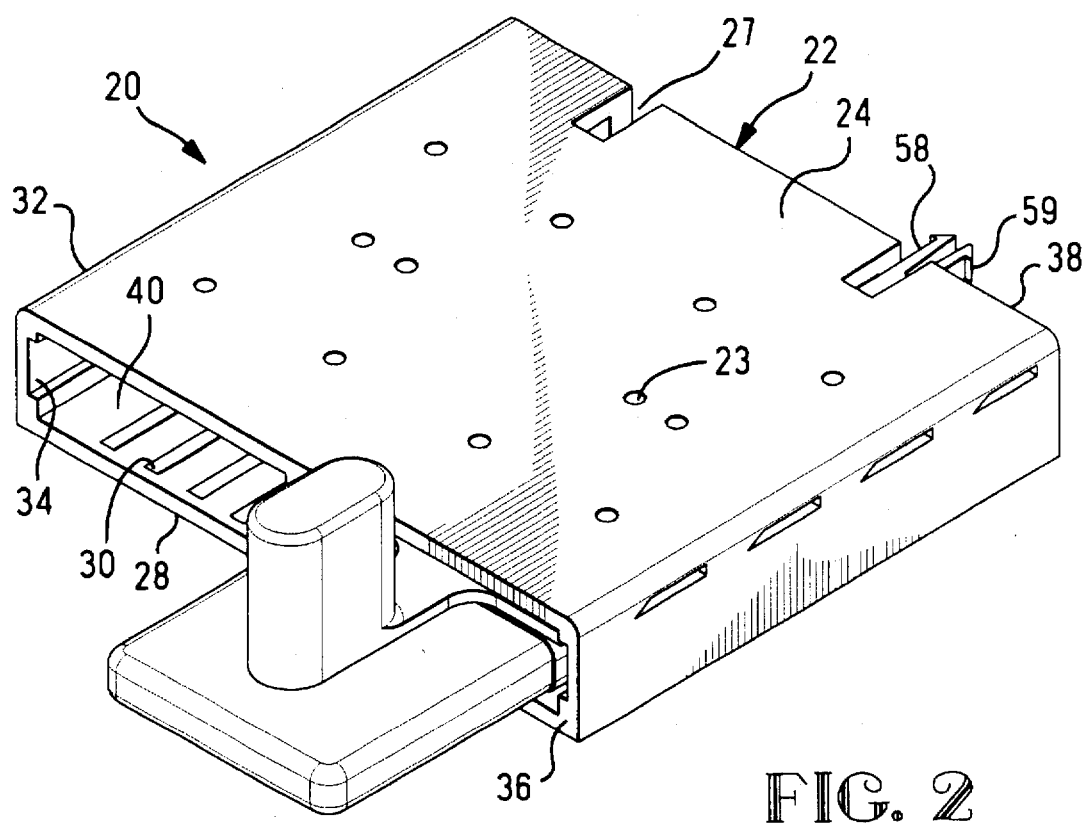
FIG. 2 is an isometric view of the card reader of FIG. 1.

Referring now to FIGS. 1 through 7, card reader 20 includes a dielectric housing 22, a horizontal plate 42 and a plurality of resilient contact elements 70. The dielectric housing includes a top wall 24, a bottom wall 28, opposed side walls 32, front face 36, a rear wall 38, and intermediate wall 33, together defining two card receiving slots 40. The inside surface 25 of top wall 24 includes a plurality of recesses 26 extending between side walls thereof at selected locations therealong. The inside surface 25 defines a camming surface that cooperates with the plate 42 as more fully explained below. In the preferred embodiment, top wall 24 further includes a pattern of apertures 23 extending therethrough. FIG. 1 shows the structure of one of the card-receiving slots 40 in conjunction with a card 90. Preferably housing 22 is molded from a high strength plastic such as, for example, a polycarbonate or the like. One suitable material is LEXAN available from General Electric Company, Pittsfield, Mass.

In a first embodiment of the invention, the bottom wall 28 includes a plurality of slots 30 dimensioned to receive elongate resilient contact elements 70. Suitable contact elements include, for example, AMPLIFLEX sold by AMP Incorporated of Harrisburg, Penn. Each AMPLIFLEX connector element 70 includes a thin flexible film member 72 having a plurality of lines of conductive circuitry 74. The film 72, in turn, is wrapped around a resilient core 76 and includes a tab 77 that is secured to the bottom of bottom wall 28 of the housing as best seen in FIGS. 4 and 6.

Figure 7:
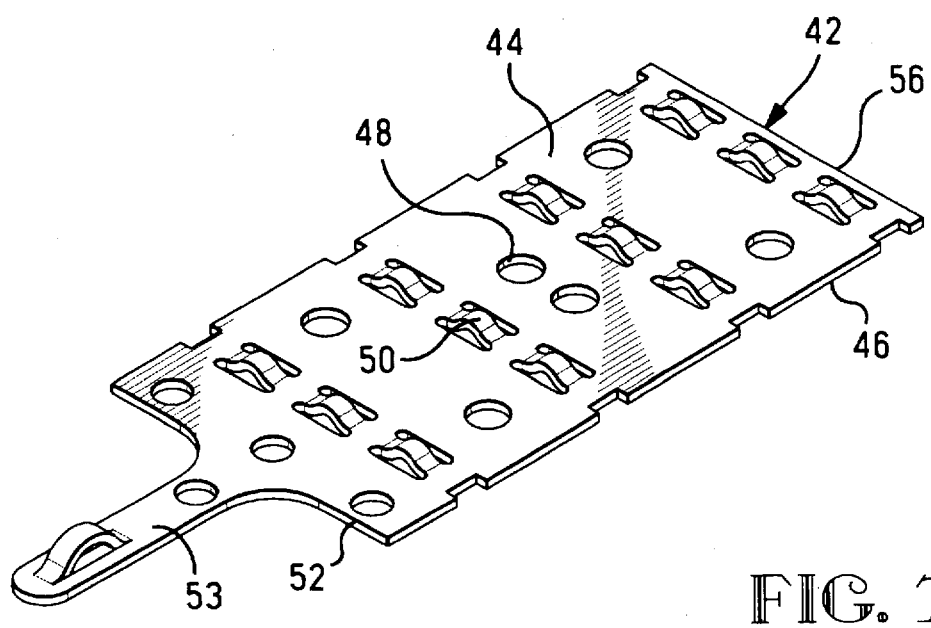
FIG. 7 is an isometric view of the plate prior to overmolding of the dielectric material.

Plate 42 includes a top surface 44, a bottom surface 46, and a plurality of apertures 48 extending therebetween and a plurality of protrusions 50 extending upwardly therefrom as best seen in FIG. 7. Plate 42 further includes a layer of dielectric material 60 molded over the surface of plate 42 and including a plurality of spaced raised portions 62 extending between the sides of the plate and essentially parallel to the forward and rearward ends 52, 56 respectively. Each raised portion 62 has tapered surfaces at the leading and trailing edges 63, 65 thereof and defines a camming surface 64 on the top thereof. The dielectric material 60 further forms an actuator 54 along arm 53 and rearwardly protruding compliant legs 58 having stop surfaces 59 thereon. Plate 42 preferably is stamped from stainless steel. Suitable dielectric materials include liquid crystal polymers or the like, such as E130 available from Hoechst-Celanese, Summit, N.J.

Upon inserting plate 42 into the card receiving slot 40, the raised portions 62 on the upper surface of the plate are received within respective corresponding recesses 26 of the top wall as best seen in FIGS. 3 and 4. The plate 42 is in its first position when the raised portions are in the respective recesses. As can be seen from FIG. 2, the protruding compliant legs 58 extend through openings 27 at the rear of the housing 22 when the plate 42 is in its first position. The actuator 54 extends outwardly from the housing 22 along the front face 24 thereof to enable manual gripping of the actuator 54 to move the plate 42 relativity toward and away from the housing 22. FIGS. 3 through 6 further show the card reader 20 mounted to the circuit board 102. Bottom wall 28 further includes board locating posts 29 which are received in corresponding apertures 106 of circuit board 102. In FIGS. 5 and 6, the contact pads 104 on the circuit board are in electrical engagement with the corresponding contact pads 96 on the card 90.

In the preferred embodiment, card reader 20 further includes a shell member 78 having a top surface 80, side walls 82 and outwardly extending wings 86 along the side walls 82 thereof. The leading edges 84 of the side walls 82 are curved inwardly. Shell member 78 includes apertures 83 extending through top surface 80. Shell member 78 preferably is stamped and formed from stainless steel or the like. Upon placing the shell member 78 within the card receiving slot 40, wings 86 along the side walls 82 are received in corresponding guide surfaces 34 of the housing side walls 32 and intermediate wall 33, as best seen in FIGS. 4 and 6.

When the shell member 78 and plate 42 are in the first position, a card 90 having a top surface 92 and a lower surface 94 having a plurality of contact pads 96 thereon can be inserted into the card reader 20. The plate 42 and shell member 78 provide sufficient clearance for the card 90 to be freely received in card receiving slot 40 without engaging the resilient contacts elements 70 extending along the bottom wall 28 of the card reader 20. Upon full insertion of the card 90, the actuator 54 may be gripped by hand and pulled forwardly such that the camming surfaces 64 are moved out of the recesses 26 and into engagement with surface 25 of the top wall thus moving plate 42 to a lower or second position. The plate 42 is thus moved toward the shell member 78 and the card 90 therebeneath. The plate 42 and shell member 78 exert pressure on the top surface 92 of the card 90 thus moving the card 90 toward the bottom wall 28 to assure that the card contact pads 94 on the bottom surface thereof are brought into electrical engagement with the associated circuitry 74 of the resilient contact elements 70 that, in turn, are electrically engaged with contact pads 104 on the circuit board 102.

The second position of plate 42 and shell member 78 are best seen by referring to FIGS. 5 and 6. As also can be seen from FIG. 5, upon moving plate 42 to its second position, the resilient legs 58 are moved into the housing 22 until the stop surfaces 59 engage the rear wall 38 of the housing. As can be seen in FIGS. 4 and 6, the wings 86 of the shell member 78 ride vertically along the vertical guide surfaces 34 as the plate 42 is moved between its first and second positions.

In the preferred embodiment, as shown in FIG. 1, top housing wall 24, plate 42, and shell member 78 include a pattern of apertures 23, 48, and 83, respectively, which permit testing for electrical continuity in the following manner. A special test card is inserted into the fully assembled card reader 20 and plate 42 and shell member 78 are then moved to their second position, thereby aligning the apertures 23, 48 and 83. A probe can then be inserted through each of the aligned apertures to test for electrical continuity between the contact members of the test card, the resilient contact elements and the circuit board pads prior to further assembly of a Type III PCMCIA card or other electrical device that includes reader 20.

FIG. 8 illustrates an alternative embodiment 120 of the card reader which a includes a single card receiving slot 140 and plate 142 and having a card 190 disposed therein.

Figure 9:
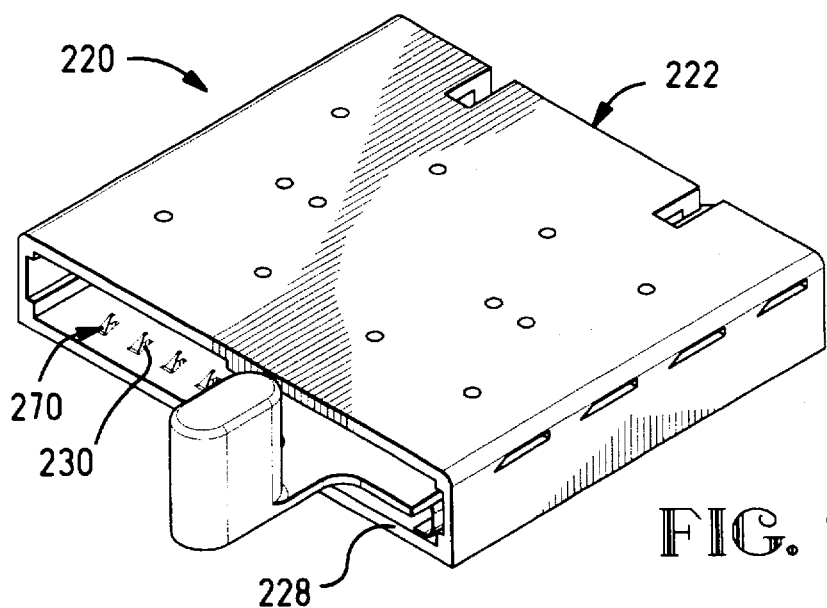
FIG. 9 is a further alternative view of the card reader having an alternative embodiment of the resilient contact elements.
Figure 10:
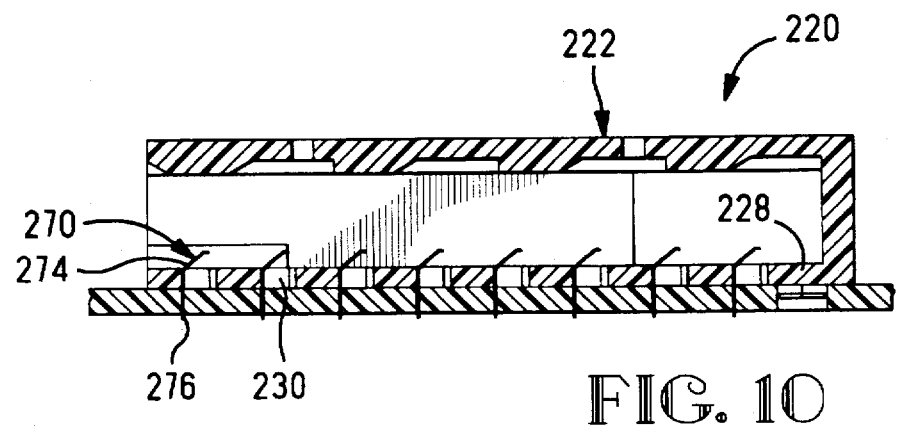
FIG. 10 is a sectional view of the connector of FIG. 9.

FIGS. 9 and 10 illustrate embodiment 220 of a card reader in which the resilient contact elements 270 are individual contact members disposed in an array of apertures 230 that extend through the bottom wall 228 of housing 222. Each contact 270 includes a curved resilient portion 274 and a board engageable portion 276. Contacts 270 may be secured in the housing by retention barbs or other retention means as known in the art.

The present invention provides a cost effective connector that allows a card having contacts on the surface thereof to be inserted into a card reader without engaging the contacts of the card reader thereby minimizing wear on the contacts surfaces. The card is then brought into engagement with the contacts upon moving a actuator to increase pressure on the card thus enabling contacts of the card to be brought into electrical engagement with corresponding contacts 104 on circuit board 102. The card reader of the present invention may be used as an independent card reader or may be included in another electrical device such as a Type III PCMCIA card frame. The card reader adapter for the PCMCIA card provides access to existing computers having the capability to access PCMCIA cards.

It is thought that the card reader of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A card reader comprising:

a dielectric housing having opposed top and bottom walls, opposed side walls, a front face having at least one card-receiving slot therein, and a rear wall;

a plurality of resilient connector elements disposed along said bottom wall and adapted to establish electrical connection between contact pads of a circuit board and contact pads of a card inserted into said at least one card-receiving slot of said reader;

said housing defining a camming surface with said card receiving slot at least adjacent said top wall;

a horizontal plate, slidably mounted within said housing proximate the top surface thereof and movable between first and second positions therein upon actuation, said plate including a cooperating camming surface adjacent and engageable with said housing camming surface whereby said plate is adapted to be moved from a first position adjacent said top wall to said second position lower than said first position upon actuation thereof moving said plate at least toward a card inserted into said card receiving slot beneath said plate to exert pressure on a top of said card and moving said card toward said bottom wall to assure contact pads thereof adjacent said bottom wall are brought into electrical engagement with associated ones of said resilient contact elements that, in turn, are electrically engaged with contact pads on said board; and an actuator section at least exposed for actuation from outside said housing for moving said late between said first and second positions.

2. The card reader of claim 1 wherein said bottom wall has a plurality of elongate slots extending therethrough and parallel to said side walls and dimensioned to receive said resilient connector elements.

3. The card reader of claim 1 wherein said resilient connector elements are elongate elastomeric members.

4. The card reader of claim 1 wherein said actuator section extends outwardly from said housing to enable manual gripping thereof to move said plate relatively toward and away from said housing.

5. The card reader of claim 4 wherein said actuator section extends outwardly from said front face.

6. The card reader of claim 1 wherein said top wall includes at least one recess extending into an inside surface thereof between said side walls and at a selected location therealong and said plate includes at least one raised portion extending between sides thereof and dimensioned to be received in a respective said at least one recess when said plate is in said first position.

7. The card reader of claim 1 wherein said top wall includes a plurality of recesses spaced along said wall between said front face and said rear wall and said plate includes a plurality of raised portions, each dimensioned to be received in a respective recess when said plate is in said first position.

8. The card reader of claim 1 further including a shell member within said card-receiving slot beneath said plate and surrounding the top and side edges of a card inserted into said slot, and engaged by said plate, whereby said shell and said card therein are simultaneously urged toward said bottom wall.

9. The card reader of claim 8 wherein wings of the shell ride vertically along vertical guide surfaces spaced inwardly from said front wall.

10. The card reader of claim 1 wherein said bottom wall has a plurality of apertures extending therethrough and dimensioned to receive said resilient connector elements.

11. The card reader of claim 1 wherein said housing further includes at least one intermediate wall extending between said top and bottom walls and parallel to said sidewalls, said at least one intermediate wall dividing said housing into at least two card receiving slots.

* * * * *

UNITED STATES PATENT AND TRADEMARK OFFICE
CERTIFICATE OF CORRECTION

PATENT NO. : 5,750,973
DATED : May 12, 1998
INVENTOR(S) : John W. Kaufman, et al.

It is certified that error appears in the above-identified patent and that said Letters Patent is hereby corrected as shown below:

On the title page, item [56] insert the following

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | | | | | | | | | | | |
| | | | | | | | | | | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 6 | 17 | 48 | 8 | A | 1 | 9/1994 | European | | | | |
| | | 0 | 6 | 21 | 55 | 1 | A | 2 | 10/1994 | European | | | | |
| | | 4 | 3 | 36 | 19 | 2 | A | 1 | 5/1995 | Germany | | | | |

Signed and Sealed this

Ninth Day of February, 1999

Attest:

Attesting Officer

*Acting Commissioner of Patents and Trademarks*